United States Patent [19]
Zimmerman et al.

[11] Patent Number: 6,092,057
[45] Date of Patent: Jul. 18, 2000

[54] UNATTENDED POS SYSTEM FOR AUTOMATIC CONTROL OF BANK SYSTEM REJECTIONS

[75] Inventors: Fred Zimmerman, Deephaven; Verne Severson, Chaska, both of Minn.

[73] Assignee: CommStar, Inc., Eden Prairie, Minn.

[21] Appl. No.: 08/989,747

[22] Filed: Dec. 12, 1997

Related U.S. Application Data

[60] Provisional application No. 60/033,477, Dec. 19, 1996.

[51] Int. Cl.$^7$ ................................................ G06F 17/60
[52] U.S. Cl. ............................. 705/44; 705/1; 705/13; 705/16; 705/18; 705/20; 705/404; 235/380; 379/91.01; 379/144; 902/22
[58] Field of Search .................................. 705/44, 1, 13, 705/16, 18, 20, 404; 235/380; 379/91.01, 144; 902/22

[56] References Cited

U.S. PATENT DOCUMENTS

| | | | |
|---|---|---|---|
| 4,891,503 | 1/1990 | Jewell | 235/380 |
| 5,311,594 | 5/1994 | Penzias | 380/23 |
| 5,520,275 | 5/1996 | Foglino | 194/217 |
| 5,677,521 | 10/1997 | Garrou | 235/375 |
| 5,728,999 | 3/1998 | Teicher | 235/381 |
| 5,794,214 | 8/1998 | Ebina et al. | 705/24 |
| 5,870,456 | 2/1999 | Rogers | 379/91.01 |

FOREIGN PATENT DOCUMENTS 2118341  10/1983  United Kingdom ............ G06F 15/21

OTHER PUBLICATIONS

"Auto–Gas Systems Inc. And Gascard Inc. Announce Island Card–Reader Interface Certification," PR Newswire [online], Feb. 1993 [retrieved on Aug. 9, 1999]. Retrieved from Dialog.

"Scanning Management Systems Introduces A Cash–ier Reporting System For IBM 4680 Supermarket Application Users," PR Newswire [online], Dec. 1991 [retrieved on Aug 9, 1991]. Retrieved from Dialog.

*Primary Examiner*—Eric W. Stamber
*Assistant Examiner*—Akiba Robinson-Boyce
*Attorney, Agent, or Firm*—Patterson & Keough, P.A.

[57] ABSTRACT

An automatic process for use in point-of-sale credit card or debit card systems for taking corrective action based on information returned from the banking system and/or the point-of-sale system. The automatic process replaces the human clerk as the interface in control of action by the point-of-sale device enabling unattended operation. The automatic process includes the maintenance of a hot list for denying use of repeatedly rejected cards, stopping the automatic operation if the banking system denies point-of-sale device access, and allows for local proprietary cards to be used independent of the banking system.

54 Claims, 2 Drawing Sheets

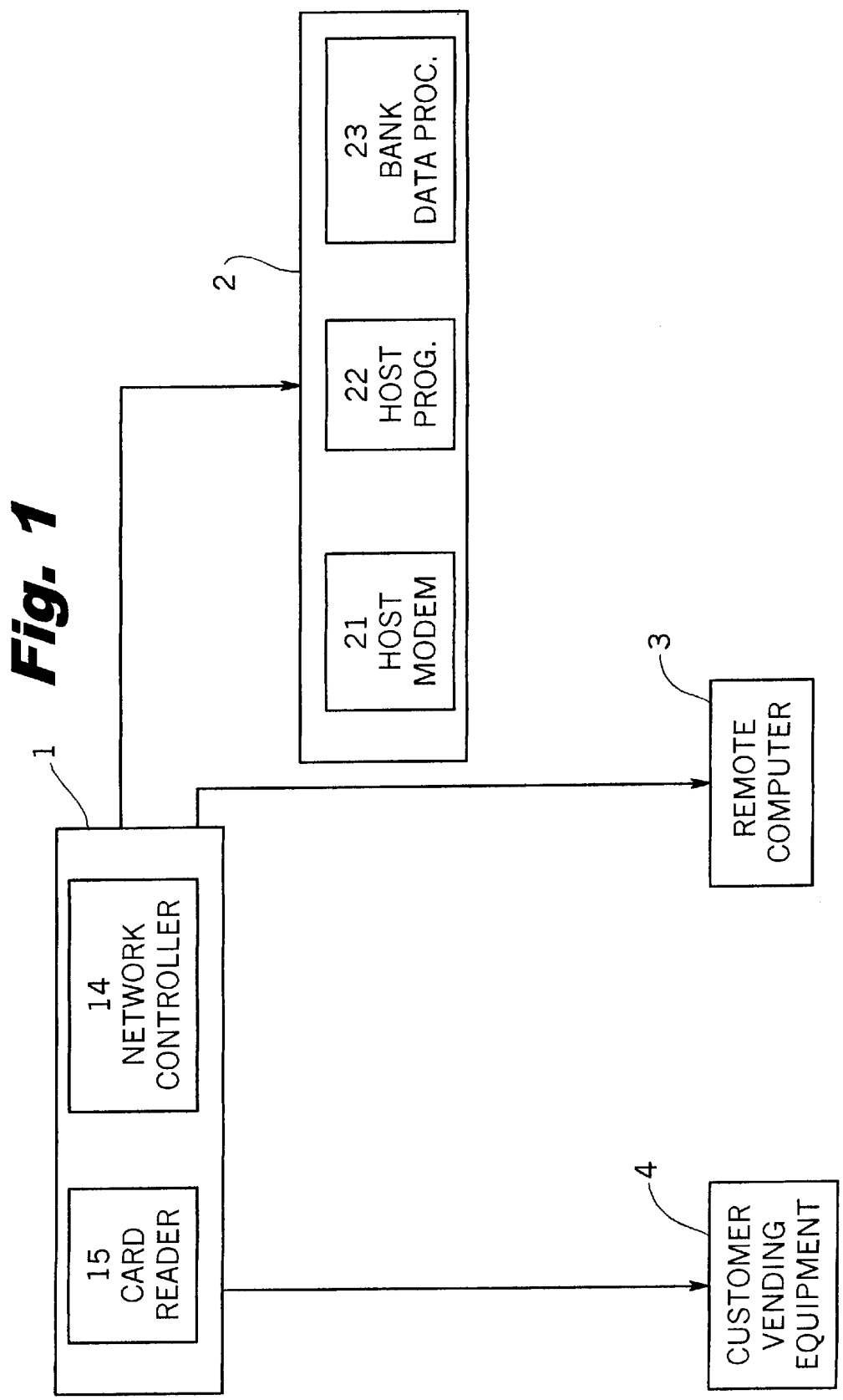

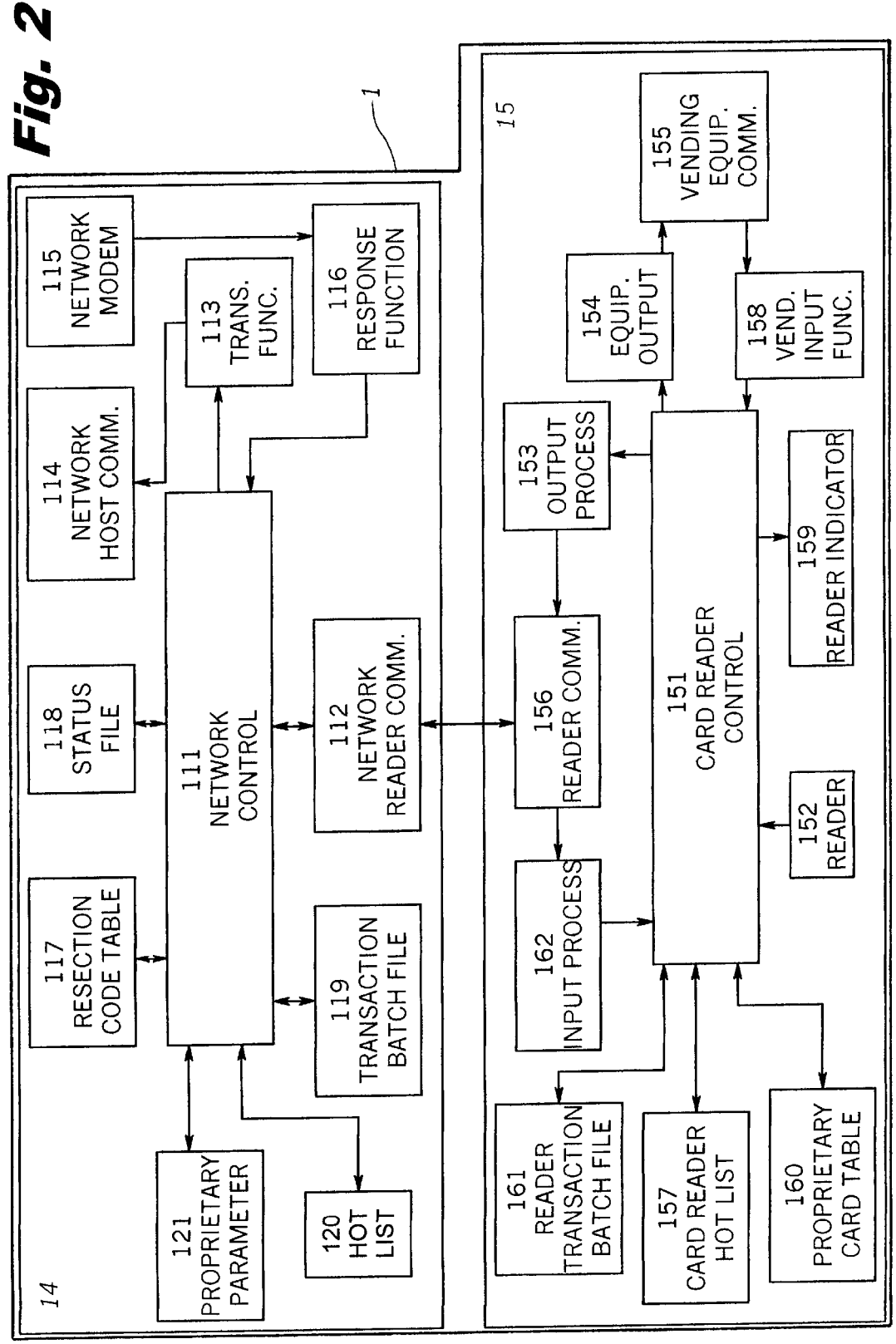

UNATTENDED POS SYSTEM FOR AUTOMATIC CONTROL OF BANK SYSTEM REJECTIONS

RELATED APPLICATION

This application claims the benefit of U.S. Provisional Application Ser. No. 60/033,477, filed Dec. 19, 1996.

TECHNICAL FIELD

The present invention relates generally to point-of-sale credit or debit networks and in particular to the automatic control of card submissions from a remote terminal that are rejected by the card approving agents. The terminal is located in an area where it is unattended by a clerk or other human management functions which would normally tend to these activities.

BACKGROUND ART

Point-of-Sale (POS) devices with various capabilities are installed in remote locations. These terminals (or devices) automatically dial to a host processor for approval of a credit card when a customer desires to charge services. The card is typically swiped through a credit card magnetic stripe reader and the data from the stripe is sent to the banking system for approval. If the card is refused, then the merchant clerk does not accept the card as payment for the goods. If the buyer tries to re-submit the card the clerk informs the buyer that the card will not be accepted, thus avoiding the cost of another transaction to the banking system. Also if the card or terminal operation is refused for several other reasons, the merchant clerk is notified by the terminal display and will take action to remedy the situation by calling the banking system for assistance.

In an unattended operation (no sales clerk) such as in a vending machine, a POS terminal will allow a card to be swiped by the user (or consumer). The POS device then dials to the card approving processor and approves the sale or disapproves of the sale automatically. In some cases due to time restraints and depending on the value of the goods to be delivered, the POS device may batch or process the approval for the card after the fact of providing the merchandise. In this case, the vendor of the goods takes the risk if the card is not approved (rejected). In addition, in unattended operation, the consumer may try to use the card over and over since there is not clerk present to block this activity.

SUMMARY OF THE INVENTION

The invention is an automatic process for use in credit card or debit card systems for taking corrective action based on information returned from the banking system. The automatic process replaces the human clerk as the interface in control of action by the POS device enabling unattended operation. This includes maintenance of a hot list for denying use of repeatedly rejected cards, stopping the automatic operation if the banking system denies POS access, and allows for local proprietary plastic cards to be used independent of the banking system.

An object of the present invention is to provide a means for a remote unattended POS device to track transaction rejections from the host card processor and block the repeated use of that card under certain circumstances. This blocking will save the costs incurred with continuous dialing of the host computer and will provide for less risk in batch processing when there is no authorization prior to dispensing goods.

The invention includes the case that the unattended card readers may also be located remotely from a network controller which communicates to the banking system. This network controller can provide a communications means for several POS reader devices.

The invention involves creating a hot list and other rejection files which are located in the network controller. When a magnetic stripe reader sends a transaction to the network controller and the card is rejected, the network controller places the card number in a hot list or file. This new entry in the hot list is also then transmitted to all the POS reader devices connected to the network controller.

A duplicate hot list is located in the POS device that is checked each time a card is presented by the consumer. If the card number has been entered into the hot list by the network controller, then the card is rejected immediately.

Many card processing networks do not approve of POS devices keeping their own hot lists because card holders may get upset as their card moves in and out of approval status and should not be rejected at any certain time. Since most card rejections are on a daily basis, the invention provides for the hot list to keep a "last-date-checked" posting on each card. If the card has not been checked during the current day, or the interval that the bank system uses, then the card reader will request another check from the network controller. If the card passes and is approved, the card number is deleted from the hot list in all POS devices attached to that controller. If the card is rejected, then the current day posting is updated and the card will automatically be rejected if re-used without incurring costs with the host card processing computer.

In some cases, the host may reject the card request for a reason that is not totally related to insufficient credit on the card. An example would be that the bank processing center was not available at the time of processing to handle the request. Since the vending machine has already dispensed the goods, the vendor operator would lose the value of the sale. This invention would sense the "soft" rejection and hold the transaction reprocessing at a later date. The host may then be available and the transaction would then be approved and processed.

Another form of the invention is to sense the rejection of the transaction because of some incorrect terminal parameter. An example would be that the date and time are incorrect in the POS terminal and therefore all transactions are rejected. This invention keeps a file of these rejections and stops the readers from accepting new transactions until the problem is resolved. In addition the owner of the vending equipment will be notified by the invention by the POS device dialing a fax or computer to report its transgression with the host computer.

Another object of this invention is to process vending operations with a proprietary customer card without involving a banking system. In this case the bad-card list (hot list) is used to set a limit on the use of authorized proprietary cards as set by the vending operator. The card is kept in the transaction batch and when the total uses allowed is reached, the readers will be notified to not accept further uses of the particular card.

BRIEF DESCRIPTION OF DRAWINGS

FIG. 1 is a block diagram depicting an entire system for providing unattended POS process for automatic control of banking system rejections and use of proprietary cards. It includes the POS device 1, the banking system 2, the vending equipment 4, and a user computer for remote control 3.

FIG. 2 is a block data flow diagram depicting the functions in the POS device which are used to carry out the processes described in the invention. The subsystems provide for hot list control and modifications to normal processes as described below.

DETAILED DESCRIPTION OF THE INVENTION

Referring to FIG. 1, the unattended POS system for automatic control of bank system rejections includes POS device 1, banking system 2, a remote computer 3, and customer vending equipment 4.

The banking system 2 further includes a host modem 21, host processor 22 and bank data processor 23 operably coupled to communicate with each other.

The POS device 1 includes network controller 11 operably coupled to card reader 15. Several card readers 15 may be connected to one network controller 11 allowing for several vending machines 4 to communicate to the network controller 11. The card reader 15 may operate independently from the network controller 11.

Referring to FIG. 2, the network controller 11 is a microprocessor-driven component that receives credit or debit card data from an input device via a serial of LAN channels and processes the data received. Preferably, it is a printed circuit board that contains a microprocessor, input/output hardware capability and battery-backed digital memory. It also contains a modem device for communications to a banking system. In the preferred embodiment of the invention, the network controller 11 is Model 680 assembled circuit board sold by DATACARD® Corporation.

The network controller 11 further includes network control function 111, network reader communication function 112, transmission function 113, network host communication function 114, network modem 115, response function 116, rejection code table 117, status file 118, transaction batch file 119, hot list 120 and proprietary parameters 121. It is understood that the functions, tables, files, lists and parameters are processed, stored and/or maintained as part of the software program(s) operating the network controller 11.

The card reader 15 is a microprocessor-driven product that can read credit card data, process the data and provide an interface both to the network controller 11, the human user (such as LCD indicator 159) and the vending equipment 4. In the preferred embodiment, the microprocessor-driven product is the CommStar Model 1000 Unattended Card Reader (UCR) in the EasyReader® System product line.

The card reader 15 further includes card reader control function 151, reader function 152, output processing function 153, vending equipment output function 154, vending equipment communications module 155, card reader communications module 156, card reader hot list 157, vending input function 158, reader indicator 159, reader proprietary card table 160, reader transaction batch file 161 and input processing function 162. In the preferred embodiment, the reader indicator 159 is an LCD screen. It is understood that the functions, modules, tables, lists and files are processed, stored and/or maintained as part of the software program(s) operating the card reader 15.

In operation, the POS device 1 operates in two modes, depending on the type of card a user puts in the card reader 15 for a transaction. If the card was issued by a financial or banking institution, the POS device 1 sends the transaction data to that issuer for approval or disapproval via the banking system 2. Similarly, if the card is a travel or entertainment type card, the transaction is sent to the issuer. If the card is a local proprietary card, the POS device 1 operates without accessing the banking system 2. An example of a local proprietary card is one issued by a vending machine company or operator for use in its vending machines. Processing in each mode is described in greater detail below.

Processing of bank issued cards

In this mode the card reader control function 151 senses card data from reader function 152 and determines that it is a charge card to be used in a transaction and sends the data to the output processing function 153 for transmission. Depending on the parameters set in the card reader control function 151, the card reader control function 151 may accept the card data as acceptable and send the customer vending equipment 4 a signal to dispense goods through the vending equipment output function 154 and the vending equipment communications module 155. The card reader output processing function 153 sends the data to the card reader communications module 156 which forms the data into a proper format so that the network controller card reader communications function 112 can receive it for further processing. The network controller 11 may be permanently connected to one or more card reader(s) 15 or connected only at transaction collection time. If the network controller 11 is connected to one or more card reader(s) 15 only at transaction collection time, then the card reader communication function 156 and the network controller card reader communication function 112 must exchange a password so that system integrity can be maintained.

The network controller card reader communication function 112 passes the transaction to the network control function 111 which determines that the transaction is a sale and must be transmitted to the banking system 2. The network control function 111 passes the data to the transmission function 113 where it is formatted to the proper financial network format and then passed to the network controller host communications function 114 where the data is insured of transmission using the proper protocol through the network controller modem 115, on to the host processor's modem 21 and to the host processor 22 for authorization. The host processor 22 determines if the data is proper for sending on to the bank data processor 23 for authorization. If the bank data processor 23 rejects the card data then the bank data processor 23 formats a rejection and sends it back to the network controller 11 via the host processor 22 and the modems 21 and 115 and the network controller host communication function 114. The host communication function 114 delivers the incoming message to the response function 116 where it sends it to the network control function 111 for processing.

Since the transaction was rejected from the banking system 2 the network control function 111 refers to the table of rejection codes 117 which determines the proper action to take. The table of rejection codes 117 is defined by the POS system 1 and contains the action instructions to take based on the rejection code. If table 117 indicates that the rejection means that the network controller 11 is not set properly with the banking system 2, then the network control function 111 will stop the POS system 1 operation and post the reason for stopping the operation in the status file 118. When the network controller 11 is in the stop mode, it will not respond to transactions sent from any card readers 15 thus stopping vending operation. The network controller 11 will report the information in the status file 118 when queried so that corrective action can be taken. The network controller 11 will report the vending stoppage to a remote computer 3 by sending an error report of the status in the status file 118 to the remote computer via the transmission function 113, the host communication function 114 and the network modem 115.

If table 117 indicates that the rejection means that the transaction data was not accepted by the host processor 22 due to a reason that indicates that at a later date the transaction might be accepted, such as the host had a temporary problem, then the control function 111 will mark the subject transaction as temporarily pending in the transaction batch file 119. The network control function 111 has logic that will search the transaction batch file 119 at the close of the business day to determine if there are any pending rejects in the file 119. If there are pending rejects, they are re-sent via the transmission function 113 and the host communications function 114 to the banking system 2 as a re-submission of the transaction.

If table 117 indicates that the rejection means that the transaction data was not accepted by the host processor 22 due to a reason that permanently rejects the transaction, then the network control function 111 will mark the transaction contained in the transaction batch file 119 as rejected. This rejected transaction will not be re-submitted to the banking system 2.

The network control function 111 will also take further action if the transaction was rejected by the banking system 2 for any reason. The network control function 111 will post the transaction card number to the network controller 11 hot list 120. The hot list 120 will be updated immediately when a transaction is rejected by the banking system 2. As soon as the network control function 111 completes the update of the hot list 120, the network control function 111 will communicate the transaction card number that was entered into the hot list 120 to the card reader hot list 157. At the beginning of the next business day, the network control function 111 will mark the current hot list entries as old entries and update all reader hot lists 157 with this new status. If a card transaction is requested to be resubmitted by the vending equipment 4, via communication to the vending communications function 155 and the vending input function 158 to the card reader control function 151 which relays to the network control function 111 and the card is accepted by the banking system 2 then the card transaction number will be removed from the network controller hot list 120 and removed by the network control function 111 via commands to all the reader hot lists 157.

Processing of bank issued cards using the hot list

If a card is presented at the card reader function 152 when hot list checking is activated, then the card reader control function 151 will compare the card number to all numbers in the reader hot list 157. If the card number is found in the hot list 157, and is it not marked as an old entry, the control function 151 will post a not-accepted message on the reader indicator 159 and notify the vending equipment 4 of the bad case use. The transaction from this bad card will not be processed further. If the card number is found in the hot list 157, and it is marked as an old entry, the card reader control function 151 will send the transaction to the network controller 11 for processing to the banking system 2. If the banking system 2 rejects the card again, the card is marked as a new rejection by the network control function 11 in the hot list 120 and broadcast to all reader control functions 151, which will update their hot lists 157 with the new rejection. If the re-submitted card is approved by the banking system 2 then the card number will be removed from the controller hot list 120 by control function 111 and also from the reader hot lists 157 by a command to their reader control functions 151 from the network control function 111. If the card that has been read by card reader function 152 is not in the reader hot list 157, then the card is processed normally as a transaction.

Processing of local proprietary cards

A local customer proprietary card is issued to the user by the vending equipment operator. The local proprietary card may be issued by a human clerk or may be issued automatically at an unattended kiosk through use of a bank issued card. For example, a user may pay for a local proprietary telephone card or vending machine card using credit from a bank issued card. In that case, the POS device 1 transaction is issuing the proprietary card rather than dispensing goods or services. Approval and disapproval of the credit on the bank issued card is processed as any other transaction described above.

The proprietary card includes a card number, an expiration date, a customer identification code (customer ID), a customer project code (project ID). In the preferred embodiment of the invention, the card number is ten digits. The customer identification code follows the expiration date and contains four digits. The project code follows the customer identification code and also contains four digits.

The card reader 15 is pre-set with one or more customer identification parameters and project parameters that identify the allowable customer identification and project identification codes as specified by the operator.

When a card is read by card reader function 152, the reader control function 151 checks the card presented to see if it matches the description of an acceptable card. More specifically, the reader control function 151 compares the card number to the reader proprietary card table 160. If the card number is found in the reader proprietary card table 160, then the customer ID and project ID are checked for conformance with the allowable parameters. If the customer ID and project ID are acceptable, then the expiration date is checked to see if the card has expired, i.e. the current date is after the expiration date. If the card does not match the description of an acceptable card, the appropriate error message is given. For example, if the customer ID and/or project ID do not conform to the allowable parameters, a "wrong type card" message is posted to reader indicator 159.

If the card matches the description of an acceptable card in table 160, and the card data is not in the hot list 157, then the control function 151 will transmit the card data to the network controller 11 indicating that the card is a local proprietary card. This means that the card will be approved in the network controller 11 and not sent to the banking system 2. The network control function 111 in the network controller 11 will add the transaction to the transaction batch file 119 marking it as a local transaction so that it will not be transmitted to the banking system 2.

The network controller 11 includes several processing parameters 121. Processing parameters 121 can specify if the card has a local limited use of either daily or for the life time of the card. Preferably, the processing parameters 121 are stored in a table format for ease of look-up. In the preferred embodiment, the processing parameters include an enable/disable setting for use of proprietary cards, an automatic concatenation (adding use to one card number) setting, a card amount limit setting, card limit and type of use (such as daily or unlimited) setting. Typically a dollar amount is used for the card amount limit setting. The network controller 11 processing parameters 121 are predetermined by the operator and set prior to accepting any cards.

Once the network control function 111 receives card data, the network control function 111 checks the proprietary card processing parameters 121 to determine if the card is to have a limited use. The network control function 111 checks the parameters 121 to see if a card limit has been set. If a limit has not been set, then the card number, date and total amount charged is stored in a proprietary file for later collection and a corresponding message is sent to the card reader 15.

If the parameters 121 specify a daily limited use, then the card transaction is checked as it enters the transaction batch file 119 for a previous use. If there has been a previous use of the transaction as indicated by the file 119, then the amount of use is checked. If the amount of use exceed the amount authorized in the parameters 121, then the card number is entered into the network controller hot list 120 and a card disapproval message is sent to the card reader 15. Once the card number is entered into the network controller hot list 120, it is then broadcast to the readers 15 just as any entry to the reader hot list 157. If the amount of use has not exceed the authorized parameters 121, then a card approval message is sent to the card reader 15.

When the transaction batch file 119 is closed, the active entries in the transaction batch file 119 are transferred to the proprietary file. It is understood that the proprietary data in the transaction batch file 119 could also be marked as proprietary data rather than transferring the entries to a separate file. The hot list 120 is cleared of entries on a predetermined basis. For example, if the transaction batch file 119 is closed daily, the hot list 120 is cleared of entries at the time the transaction batch file 119 is closed.

The remote user computer 3 is programmed to connect to the network controller 11 at a specified time. After the connection is made, the remote computer 3 sends a signal to the control function 111 via the modem 115, the host communications function 114 and the response function 116. The signal requests the network control function 111 to send data from the transaction file 119 that is marked as proprietary data. Alternately, it is understood that the network control function 111 may send data from the transaction file 119 that is marked as proprietary and/or may send one or more files which contain proprietary data. The network control function 111 sends the data to the remote user computer 3 which stores the data in a database format for further processing and/or billing.

Separated network controller and readers

In processing either bank cards or proprietary cards, the reader(s) 15 may operate independently from the network controller 11 by enabling the control function 151 to send transactions to reader transaction batch file 161. Multiple transactions may be entered into the file 161 by the control function 151. When a separated or portable network controller 11 is connected to the reader 15 via the reader communications function 156, a special password and protocol is used with input processing function 162 to identify the controller 11 as authorized to receive transaction data stored in batch 161. If the password and protocol are correct, then the control function 151 is notified and transactions from the batch 161 are transmitted to the network controller 11. The network controller 11 stored the information in its transaction batch file 119. When the controller modem function 115 senses that it has the proper facility to transmit the data to the banking system 2, it will notify the network control function 111 which will initiate a transmission of the transactions from the batch file 119 to the host processor 22 which will process the data in a normal mode. During this connection, the network control function 111 will initiate a hot list update by sending all data from the network hot list 120 to the reader control function 151 which will clear the reader hot list 157 and then replace the contents with the data from the network controller hot list 120.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A point-of-sale (POS) system for processing a sales transaction and a vending operation initiated by a data card at an unattended point-of-sale device:

a card reader including a hot list, said card reader designed to read data from said data card, to determine a type of data card being used, to compare the read data with said hot list, and to produce a hot list status indication of the read data; and a network controller designed to be communicatively coupled to said card reader and to process said sales transaction and said vending operation according to both said type of data card and said hot list status indication wherein said hot list comprises new and old entries and wherein said new entries become designated as old entries at a predetermined time.

2. The POS system of claim 1, wherein the processing of said sales transaction and said vending operation includes stopping all other vending operations of said POS system.

3. The POS system of claim 2, wherein said network controller stops all vending operations of said POS system due to a rejection code that is set within said network controller.

4. The POS system of claim 3, wherein said rejection code that is set is selected from a group consisting of an incorrect time, an incorrect data card type, and an incorrect merchant identification.

5. The POS system of claim 3, wherein said network controller is designed to report said rejection code.

6. The POS system of claim 1, wherein said network controller is designed to submit said sales transaction to an outside source for approval.

7. The POS system of claim 2, wherein said network controller is designed to submit said sales transaction to an outside source for approval.

8. The POS system of claim 6, wherein said network controller is designed to submit said sales transaction to said outside source for approval again if approval was not received on an earlier submission.

9. The POS system of claim 7, wherein said network controller is designed to submit said sales transaction to said outside source for approval again if a non-stop rejection code is received and if approval was not received on an earlier submission.

10. The POS system of claim 6, wherein upon approval of said sales transaction by said outside source, any reference to said data card is removed from said hot list.

11. The POS system of claim 1, wherein said card reader is designed to stop said sales transaction when the comparison of read data with said hot list produces a match between said new entry and said read data.

12. The POS system of claim 1, wherein said network controller includes a second hot list and wherein said hot list of said card reader is updated by said network controller to correspond to said second hot list.

13. The POS system of claim 1, wherein said network controller includes a second hot list and wherein said second hot list is updated according to said hot list of said card reader.

14. The POS system of claim 1, wherein said hot list is designed to keep a "last-date-checked" posting on said data card.

15. The POS system of claim 1, wherein said network controller is portable.

16. The POS system of claim 15, wherein said portable network controller uses a password to gain access to communication with said card reader.

17. The POS system of claim 1, wherein said card reader is designed to produce a user notification message.

18. The POS system of claim 1, wherein said data card is a local proprietary card.

19. The POS system of claim 1, wherein said data card is selected from a group consisting of a financial institution card, a travel card, and an entertainment card.

20. The POS system of claim 1, wherein said network controller further includes proprietary parameters and wherein said proprietary parameters are used to process said sales transaction and said vending operation.

21. A method for processing a sales transaction and vending operation initiated by a data card at an unattended point-of-sale device, comprising the steps of:

reading data from said data card;

determining type of data card being used;

comparing the read data with a hot list that comprises new and old entries;

producing a hot list status indication of the read data from the read data with hot list comparison;

processing said sales transaction and said vending operation according to both said type of data card and said hot list status indication; and designating said new entries as old entries at a predetermined time.

22. The method of claim 21, wherein the step of processing said sales transaction further comprises updating said hot list.

23. The method of claim 21, further comprising the step of notifying the user of the status of the sales transaction.

24. The method of claim 21, further comprising the step of comparing the read data to proprietary parameters and producing a proprietary parameters status indication.

25. The method of claim 24, wherein the step of processing said sales transaction and said vending operation according to both said type of data card and said hot list status indication further comprises processing said sales transaction and said vending operation according to said proprietary parameters.

26. The method of claim 21, further comprising the step of dispensing goods through said unattended point-of-sale device.

27. A point-of-sale (POS) system for processing a sales transaction and a vending operation initiated by a data card at an unattended point-of-sale device, wherein said data card may be one of two types, comprising:

a card reader including a hot list, said card reader designed to read data from said data card, to determine which of the two types of data cards being used, to compare the read data with said hot list, and to produce a hot list status indication of the read data from the read data with hot list comparison; and a network controller designed to be communicatively coupled to said card reader, to submit said sales transaction to an outside source for approval upon notification from said card reader of the first type of data card and an acceptable hot list status indication, and to process approval of sales transaction itself upon notification from said card reader of the second type of data card and said acceptable hot list status indication, wherein said hot list comprises new and old entries and, wherein said new entries become designated as old entries at a predetermined time.

28. The POS system of claim 27, wherein the processing of said sales transaction and said vending operation includes stopping all vending operations of said POS system.

29. The POS system of claim 28, wherein said network controller stops all vending operations of said POS system due to a rejection code that is set within said network controller.

30. The POS system of claim 29, wherein said rejection code that is set is selected from a group consisting of an incorrect time, an incorrect data card type, and an incorrect merchant identification.

31. The POS system of claim 29, wherein said network controller is designed to report said rejection code.

32. The POS system of claim 27, wherein said network controller is designed to submit said sales transaction to an outside source for approval.

33. The POS system of claim 28, wherein said network controller is designed to submit said sales transaction to an outside source for approval.

34. The POS system of claim 32, wherein said network controller is designed to submit said sales transaction to said outside source for approval again if approval was not received on an earlier submission.

35. The POS system of claim 33, wherein said network controller is designed to submit said sales transaction to said outside source for approval again if a non-stop rejection code is received and if approval was not received on an earlier submission.

36. The POS system of claim 32, wherein upon approval of said sales transaction by said outside source, any reference to said data card is removed from said hot list.

37. The POS system of claim 28, wherein said card reader is designed to stop said sales transaction when the comparison of read data with said hot list produces a match between said new entry and said read data.

38. The POS system of claim 27, wherein said network controller includes a second hot list and wherein said hot list of said card reader is updated by said network controller to correspond to said second hot list.

39. The POS system of claim 27, wherein said network controller includes a second hot list and wherein said second hot list is updated according to said hot list of said card reader.

40. The POS system of claim 27, wherein said hot list is designed to keep a "last-date-checked" posting on said data card.

41. The POS system of claim 27, wherein said network controller is portable.

42. The POS system of claim 41, wherein said portable network controller uses a password to gain access to communication with said card reader.

43. The POS system of claim 27, wherein said card reader is designed to produce a user notification message.

44. The POS system of claim 27, wherein said second type of data card is a local proprietary card.

45. The POS system of claim 27, wherein said first type of card is selected from a group consisting of a financial institution card, a travel card, and an entertainment card.

46. The POS system of claim 27, wherein said network controller further includes proprietary parameters and wherein said proprietary parameters are used to process said sales transaction and said vending operation.

47. A method for processing a sales transaction and vending operation initiated by a data card at an unattended point-of-sale device, wherein said data card may be one of two types, comprising the steps of:

reading data from said data card;

determining which one of the two types of data cards is being used;

comparing said read data with a hot list that comprises new and old entries;

producing a hot list status indication of the read data from the read data with hot list comparison; and processing approval of said sales transaction whereby said sales transaction is submitted to an outside source for approval when both a first type of data card is determined and an acceptable hot list status indication is produced, and whereby said sales transaction is submitted to an internal source for approval when both a second type of data card is determined and said acceptable hot list status indication is produced; and designating said new entries as old entries at a predetermined time.

48. The method of claim 47, wherein the step of processing approval of said sales transaction further comprises updating said hot list.

49. The method of claim 47, further comprising the step of notifying a user of whether the sales transaction has been approved.

50. The method of claim 47, further comprising the steps of comparing the read data to proprietary parameters and producing a proprietary parameters status indication.

51. The method of claim 47, further comprising the step of dispensing goods through said unattended point-of-sale device.

52. A point-of-sale (POS) system for processing a sales transaction and a vending operation initiated by a data card at an unattended point-of-sale device, comprising:

a card reader including a hot list, said card reader designed to read a data card, determine if said data card is an acceptable proprietary card from the read data, compare the read data with said hot list, and produce a hot list status indication of the read data; and a network controller having internal processing parameters, said network controller designed to be communicatively coupled to said card reader and to process said sales transaction and said vending operation according to said internal processing parameters and said hot list status indication, wherein said hot list comprises new and old entries and, wherein said new entries become designated as old entries at a predetermined time.

53. The POS system of claim 52, wherein said proprietary card includes a card number, an expiration date, a customer identification code, and a customer project code.

54. The POS system of claim 52, wherein said processing parameters include an enable/disable setting, an automatic concatenation, a card amount limit setting, and type of use setting.

* * * * *